United States Patent [19]
MacDaniel

[11] 3,739,976
[45] June 19, 1973

[54] INSULATED PLASTIC BUCKET
[75] Inventor: Gene D. MacDaniel, Lithonia, Ga.
[73] Assignee: Sweetheart Plastics, Inc., Wilmington, Del.
[22] Filed: Nov. 26, 1971
[21] Appl. No.: 202,166

Related U.S. Application Data
[62] Division of Ser. No. 879,448, Nov. 24, 1969, Pat. No. 3,664,568.

[52] U.S. Cl.............. 229/43, 220/60 R, 220/44 R
[51] Int. Cl........................ B65d 5/64, B65d 43/00
[58] Field of Search........................ 229/1.5 B, 43; 220/60 R, 44, 97 C; 215/41; 150/.5

[56] References Cited
UNITED STATES PATENTS
3,484,015  12/1969  Rowan............................ 220/44 R X
3,521,788  7/1970  Kandel et al................. 229/1.5 B X Primary Examiner—George T. Hall
Attorney—Arthur Z. Bookstein

[57] ABSTRACT

A container having a wrapped side wall of foam plastic sheet material with the side margins overlapped and welded together, and a separately formed bottom having a central portion generally perpendicular to the container axis and with an annular skirt extending away from the plane of the central portion and sealed to the lower margin of the side wall. A lid made of the same material fits over the upper margin of the container.

4 Claims, 7 Drawing Figures

INSULATED PLASTIC BUCKET

This application is a divisional application of U.S. Pat. application Ser. No. 879,448 filed Nov. 24, 1969, now U.S. Pat. No. 3,664,568.

This invention relates to disposable containers and lids made of plastic, and more particularly comprises a new and improved insulated disposable container and lid made from foam plastic sheet. The invention has particular application in the manufacture of containers in the half-gallon and larger range.

There is at the present time a growing demand for disposable containers in large sizes. This growth in part is the result of the rapidly growing business of franchised take-out food vendors such as the roadside fried chicken stands, as well as the generally increasing labor costs that make reusable containers in all industries prohibitively expensively. While in the disposable container industry plastic has captured a significant percentage of the market in smaller container sizes, thus far the larger containers of the 1-gallon size range are almost exclusively still made of paper. This is particularly true in the insulated bucket or tub field where heretofore no one has developed a commercially competitive insulated plastic tub. Conventionally the large tubs used for example as chicken buckets are made of double wrap paper. These heavy duty double wrap paper buckets are expensive, have only limited insulating properties, and generally are subject to the same failings as paper food containers made in smaller sizes, namely, they have a taste and odor which effects the contents, they absorb moisture, etc.

An object of this invention is to provide a simply constructed tub an improved lid therefor made of foam plastic which has very high insulating properties.

To accomplish those and other objects, this invention is illustrated as used with a tub made of expanded foam plastic sheet. While the invention is not limited to containers of a particular size and has application to both large and small containers, in accordance with one embodiment typically the sheet may be approximately 0.112 inch thick and having a weight of approximately 19 grams per square foot. The container is made in two parts, namely, a side wall blank which is sealed along a side seam and a preformed bottom having a skirt which abuts against the bottom of the side wall and is sealed to it. The cover or lid has a snap fit over the mouth of the container, and is provided with slits that enable vent openings to be formed in it.

Figure 1:
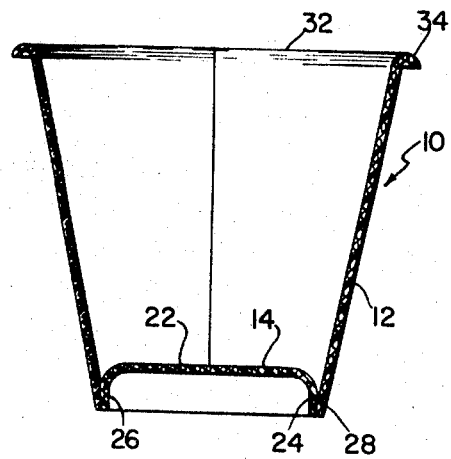
FIG. 1 is a vertical cross-sectional view of a tub of the type adapted for use with the lid disclosed.

The bucket 10 shown in FIG. 1 has a side wall 12 and a bottom 14 and may be of the type shown in U.S. Pat. application, Ser. No. 879,448, filed Nov. 24, 1969, now U.S. Pat. No. 3,664,568. The side wall 12 may be made from a blank having curved and parallel top and bottom edges of conventional form and with diverging side edges so that when the side wall is rolled into the container shape it is frustoconical with the desired side wall taper to facilitate nesting. In accordance with one embodiment the side wall 10 along with the bottom 14 are made from expanded styrene sheet of approximately 0.112 inch in thickness and weighing 19 grams per sq. ft. with a cell size of 4 to 5 mills. It is to be understood that these dimensions are not limitations to the scope of this invention.

The bottom 14 of the container is preshaped before assembly with a generally flat central portion 22 and a skirt 24 which extends downwardly from the central portion 22 generally with a downward flare of approximately 3°. The flare of the skirt is in part determined by the angle of the side wall 12. The outer diameter of the skirt 24 at the bottom edge 26 is equal to or slightly larger than the inner diameter of the bottom edge 28 of the side wall 12 so that when the bottom is assembled as shown in FIG. 1 the outer surface of the skirt 24 at its lower edge 26 engages the inner surface of the lower margin 28 of the side wall.

When the bottom 14 is assembled in the side wall 12, the lower edges are heat sealed together in a manner described in the above-mentioned patent application, and the mating surfaces of the skirt and lower margin of the side wall fuse through a height of approximately one thirty-second of an inch. From that point, the skirt and side wall diverge in a upward direction to form a well 30 which is particularly desirable as a grease trough when buckets are used to contain fried foods such as chicken. In a 1 gallon tub size, typically the height of the skirt 24 measured from its lower margin to the upper surface of the central portion 22 is approximately thirteen-sixteenths inch, and the trough 30 therefore has a height of approximately twenty-five thirty-seconds inch. Its volume is of course also a function of the taper of side wall 12. Typically it may be 12°. Thus the trough has substantial volume to accommodate grease or other substances which are given off from the material packaged in the tub.

Figure 4:
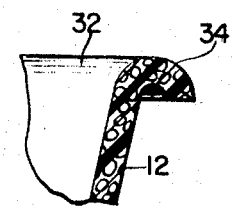
FIG. 4 is a detail view of the rim of the tubs of FIGS. 1 and 2.
Figure 5:
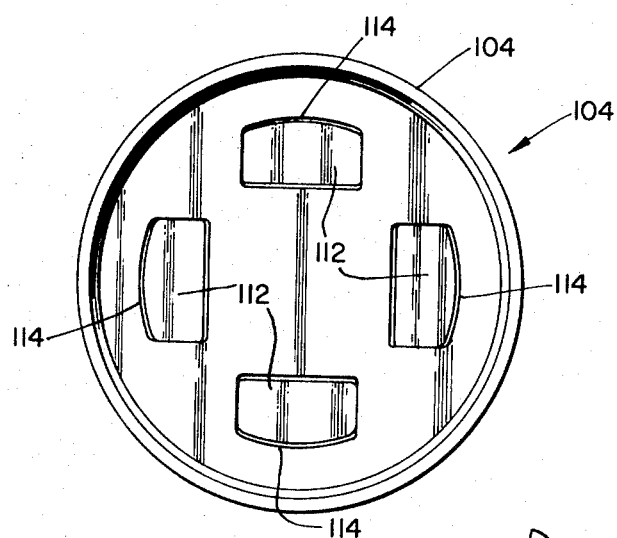
FIG. 5 is a plan view of the lid of FIG. 3.

To enhance the appearance of the tub, broaden its applications, and increase its stiffness at the mouth 32, the rim 34 is turned over as shown in FIG. 4 to form a semi-rolled lip and preferably the material of the rim is somewhat expanded so as to increase its stiffness. The application of heat to the sheet material when the rim is rolled to form the configuration illustrated may be utilized to expand the sheet material to the desired thickness.

Figure 2:
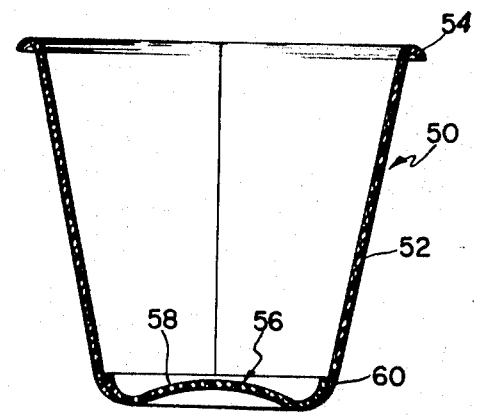
FIG. 2 is a vertical cross-sectional view of another tub.

The container 50 shown in FIG. 2 differs from the container of FIG. 1 in the construction of the bottom. Thus, the container 50 has a side wall 52 with a semi-rolled rim 54 identical to that of FIG. 1, but the bottom 56 is distinctive. The bottom includes a generally horizontal central portion 58 which may or may not be bowed upwardly as shown in the drawing to resist sagging, and the bottom also includes a peripheral skirt 60 which extends upwardly from the margin of the central portion 58. The skirt 60 is upwardly flared so that it forms the same angle with the vertical as does side wall 52. Typically this flare may be an angle of 12°.

Figure 6:
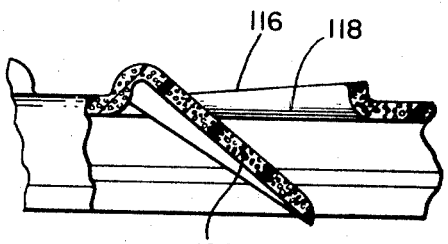
FIG. 6 is a fragmentary cross-sectional detail of the lid showing how a vent opening is formed in it.
Figure 7:
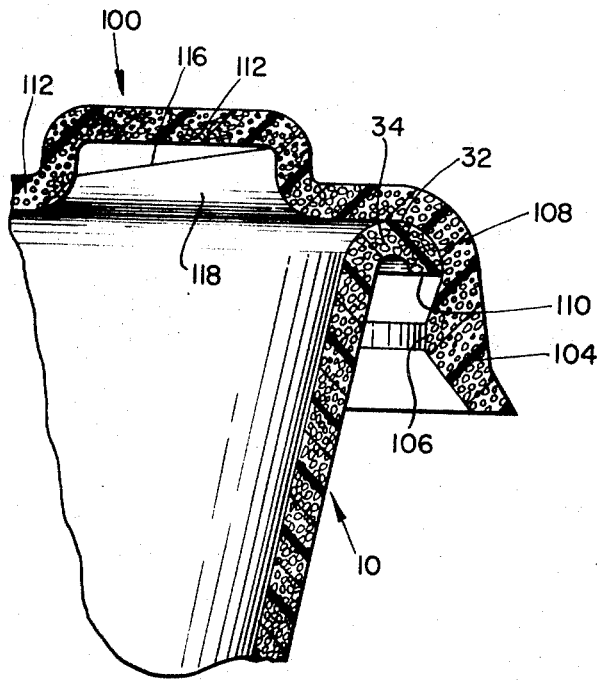
FIG. 7 is an enlarged fragmentary detail view showing the way the lid fits on the container rim.

The lid shown in FIGS. 3, and 5 to 7 is made of the same material and has substantially the same stock thickness as the containers of FIGS. 1 and 2. The container lid 100 includes a top wall 102 and a downwardly extending skirt 104. The skirt 104 is provided with an undercut ring 106 accentuated on its inner surface 108, which is adapted to engage the lower end 110 of the rolled rim 34 of the container so as to retain the lid in place over the container mouth, as illustrated in FIG. 7. The lid is provided with four upstanding bosses 112 in the top wall 102, which serve several functions. The outer edges 114 of the bosses 112 are each curved as is clearly shown in FIG. 5 so as to substantially define a circle. The bosses are adapted to fit within the skirt 24 of a container bottom stacked above it and retain that upper container in place. That is, the curved sides 114 of the bosses will prevent the upper container from slipping sideways on the top.

Preferably at least two of the bosses 112 are provided with a diagonal cut 116 which allows a portion of the bosses containing it to be bent inwardly as shown in FIG. 6 to form a vent opening 118. That is, the cut 116 forms a flap 120 in the top wall of the boss, which flap may be bent downwardly as shown in FIG. 6 to open the top of the boss. It will be appreciated that when the flap 120 is left in the formed position as in FIG. 3, the lid 100 forms a seal for the container, but when the flaps are folded downwardly as suggested in FIG. 6, the interior of the container is vented. Even when the flaps 120 are bent so as to form the vent openings 118, they do not interfere with the container which is stacked above when in fact several containers are placed one above the other.

The vent openings 118 are of sufficient size so that the fingers may be inserted through them so as to provide a convenient handle to carry the bucket. Thus the vent openings not only perform their main function of venting the contents of the container but also form a handle for the convenient carrying of the package made up of the container and lid.

From the foregoing description the containers and lid of this invention will be appreciated to have many advantages over prior art containers. The containers may have any cross sectional shape as the bottoms are preshaped and the entire container is made of plastic. The preshaped bottom may be either formed by thermoforming techniques such as pressure or vacuum forming, or it may be shaped by matched molds which work on the sheet. Because of the nature of the material used, both the bottom and top may be heat sealed. Thus the bosses 112 provided in the container lids not only facilitate stacking of filled containers, but they further facilitate stacking of the lids themselves. When the empty lids are stacked one on top of the other, the bosses 112 will cooperate with the skirts 104 to retard accidental "slicing" of the lids horizontally from a stack. The openings in the bosses provided by the slits form not only vents but gripping means as well. Moreover, it is apparent that the vent sizes may be varied by changing the angle of the bent flaps. In fact the vent flaps may be bent up or down, or even be torn off if desired. The vents are particularly desirable when the containers are used for chicken or other hot foods to allow the steam given off by the food products to escape. In this way the contents is kept relatively dry as the steam given off by the food will not tend to make the contents soggy. It will also be appreciated that the bosses 112 allow the slits to be formed horizontally in them by a horizontal blade as the lids are moved horizontally below it. Similarly, the lid may be trimmed from its web by a horizontal blade, and the arrangement may be used for lids of different diameters with altering the arrangement.

The grease trough provided in the embodiment of FIG. 1 further allows the contents to drain so that the food itself does not stand in the grease which drains from it. Because of the nature of the material from which the container is made, it will be apparent that the side wall material may be selectively expanded so as to provide raised or embossed lettering in the side wall for advertising for decorative purposes. A bucket formed of the material identified is moisture proof and grease proof and is suitable for storing hydroscopic materials. The relatively stiff rim allows the container to scoop hard materials such as ice without becoming mutilated.

Figure 3:
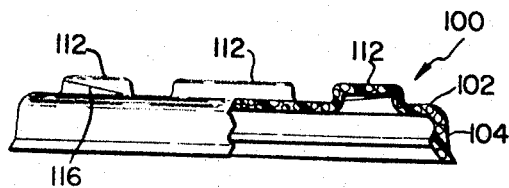
FIG. 3 is a side view, partly in section, of a lid which may be used with either of the tubs shown in FIGS. 1 and 2.

While the containers are suitable for use with the lid of FIG. 3, it will be appreciated that inside fitting lids could also be used with them. Moreover, the foam material may be combined with other materials such as an open web-like fabric or a film for added strength or texture.

What is claimed is:

1. A lid for a container formed from foam plastic material and having a sidewall defining the mouth of said container at its upper end, said sidewall being turned over at the upper edge to enhance the lateral stiffness of said container, comprising:

said lid being formed from a sheet of foam plastic material and having a down turned skirt formed about the periphery of said lid; and a bead formed on the inner edge of said skirt and being dimensioned to engage, in a snap fit, said turned over margin of said sidewall.

2. A lid as defined in claim 1 wherein said bead on said lid is adapted to engage the lower edge of said turned over margin.

3. A lid as defined in claim 1 further comprising:

means forming a plurality of offset sections in the central region of said lid; and means forming a cut in at least one of said offset portions to enable the foam material defined by said cut to be folded downwardly into the container for venting the container interior.

4. A lid as defined in claim 3 wherein said cuts are substantially U-shaped configuration and are dimensioned to allow one's finger to be inserted through said openings.

* * * * *